United States Patent
Bittles et al.

(10) Patent No.: US 9,954,777 B2
(45) Date of Patent: Apr. 24, 2018

(54) DATA PROCESSING

(71) Applicant: INTERNATIONAL BUSINESS MACHINES CORPORATION, Armonk, NY (US)

(72) Inventors: William Bittles, Hampshire (GB); Simon Davitt, Romsey (GB); Christopher Leonard, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 19 days.

(21) Appl. No.: 14/995,584

(22) Filed: Jan. 14, 2016

(65) Prior Publication Data

US 2017/0208002 A1    Jul. 20, 2017

(51) Int. Cl.
*H04L 12/755* (2013.01)
*H04L 12/721* (2013.01)
*H04L 12/707* (2013.01)
*H04L 12/751* (2013.01)

(52) U.S. Cl.
CPC .......... *H04L 45/72* (2013.01); *H04L 45/021* (2013.01); *H04L 45/08* (2013.01); *H04L 45/22* (2013.01)

(58) Field of Classification Search
CPC ....... H04L 45/72; H04L 45/021; H04L 45/08; H04L 45/22
See application file for complete search history.

(56) References Cited

U.S. PATENT DOCUMENTS

| | | |
|---|---|---|
| 6,993,038 B2 | 1/2006 | McCann et al. |
| 7,328,237 B1 | 2/2008 | Thubert et al. |
| 8,046,467 B2 | 10/2011 | Petter et al. |
| 8,543,678 B2 | 9/2013 | Nitu et al. |
| 8,751,613 B1 * | 6/2014 | Medved ............ H04L 45/00 370/229 |
| 8,792,323 B2 | 7/2014 | Shahrier et al. |

(Continued)

OTHER PUBLICATIONS

Anonymous "Configure ACE with Source NAT and Client IP Header Insert", downloaded from http://www.cisco.com/c/en/us/support/docs/interfaces-modules/ace-application-control-engine-module/107399-ace-sourcenat-config.html; Document ID 107399; Jul. 9, 2008; 9 pgs.

*Primary Examiner* — Khaled Kassim
*Assistant Examiner* — Syed S Ali
(74) *Attorney, Agent, or Firm* — Cantor Colburn LLP; Richard Wilhelm (57) ABSTRACT

A method of routing messages includes receiving a request message from an originating device to be forwarded to one of a plurality of target devices, the request message having a first network address as a source address identifying the originating device. The first network address of the request message is dynamically mapped to a second network address of a selected target device, and the first and second network addresses are stored in association with each other as address mapping information. The method also includes forwarding the selected target device using the second network address. The routing device receives from the target device an error message in relation to the request message, and identifies the originating device which originated the request message using the address mapping information and the second network address of the target device which issued the error message.

15 Claims, 4 Drawing Sheets

(56) References Cited

U.S. PATENT DOCUMENTS

| | | | |
|---|---|---|---|
| 2002/0010798 A1* | 1/2002 | Ben-Shaul | G06F 17/3089 709/247 |
| 2005/0070278 A1* | 3/2005 | Jiang | H04W 8/183 455/432.3 |
| 2007/0094237 A1* | 4/2007 | Mitchell | G06F 17/30581 |
| 2007/0112962 A1 | 5/2007 | Lewontin | |
| 2008/0320151 A1* | 12/2008 | McCanne | H03M 7/30 709/228 |
| 2009/0154363 A1* | 6/2009 | Stephens | H04L 61/1517 370/241 |
| 2011/0202678 A1* | 8/2011 | LaVoie | H04L 45/00 709/238 |
| 2011/0261823 A1* | 10/2011 | Singh | H04L 12/2838 370/395.2 |
| 2011/0319089 A1* | 12/2011 | Sharma | H04W 76/026 455/445 |
| 2015/0207724 A1* | 7/2015 | Choudhury | H04L 45/26 370/255 |
| 2015/0271303 A1* | 9/2015 | Neginhal | H04L 69/22 370/392 |
| 2017/0034056 A1* | 2/2017 | Mukherjee | H04L 45/745 |
| 2017/0070941 A1* | 3/2017 | Veillette | H04L 45/34 |
| 2017/0208002 A1* | 7/2017 | Bittles | H04L 45/72 |
| 2017/0302535 A1* | 10/2017 | Lee | H04L 41/12 |

* cited by examiner

DATA PROCESSING

BACKGROUND

The present invention relates to a data processing apparatus and method for routing messages.

It is common for client devices to communicate request messages to server devices, with the server then delivering or carrying out a requested service. One example of this is a web server in which a web application at a client device transmits a HTTP (Hypertext Transfer Protocol) request to a physically remote web server, with the web server being responsive to the HTTP request to deliver a web page to the client device. Another example is a messaging server in which a messaging application at a client device transmits a request to a physically remote messaging server to deliver a message to another device. In either case, it is also common for a cluster of server devices to be used to improve capability and resilience. In this case, a workload balancing router may be used to spray request messages evenly across the separate server devices within the cluster. The request messages may be processed at the server devices in a message queue (MQ), by a queue manager, providing a transport to back end systems. A NAT (Network Address Translation) router may be used as the workload balancing router.

Where a NAT router is used, a source IP address of the request message received from a client device for forwarding on to one of the server devices is mapped to a destination IP address by the NAT router for transmission to the server device indicated by the destination address. Generally, the allocation of the destination IP address is carried out dynamically. In some cases, the client device and/or server device may misbehave, or a request message may make a request of the server device which cannot be fulfilled. This may cause an error condition at the server device (because it cannot or will not service the request), which needs to be resolved before further request messages (from the same client device/application) can be serviced. As a result, further messages from the same client device/application may flood the error logs at the queue manager of that web server.

SUMMARY

According to an aspect of the present invention, there is provided a method of routing messages, comprising: receiving, at a routing device, a request message from an originating device to be forwarded to one of a plurality of target devices, the request message having a first network address as a source address identifying the originating device; dynamically mapping the first network address of the request message to a second network address of a selected target device, storing the first and second network addresses in association with each other as address mapping information, and forwarding the request message to the selected target device using the second network address; receiving from the target device an error message in relation to the request message; identifying the originating device which originated the request message using the address mapping information and the second network address of the target device which issued the error message; and configuring the routing of a later request message from the identified originating device.

Other aspects of the present invention include an apparatus for routing messages and a computer program for same.

DETAILED DESCRIPTION

Figure 1:
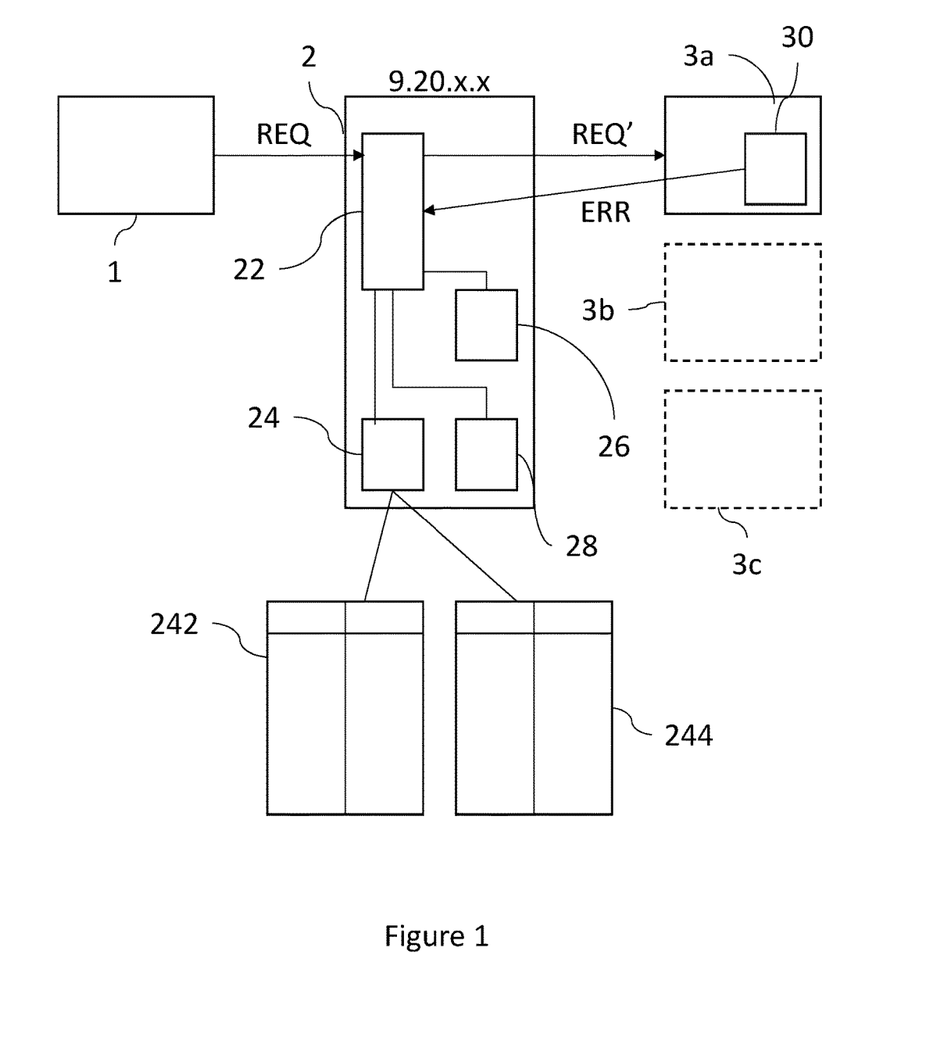
FIG. 1 schematically illustrates a client device and a server exchanging messages via a NAT router.

Referring to FIG. 1, a client (originating) device 1 running a web application is communicating with a server (target) device 3a to request the web server 3a to establish a HTTP connection or to transmit a particular web page or file back to the client device 1. The web server 3a is one of a plurality of web servers in a cluster of web servers. Two other web servers 3b, 3c are also shown. The communication of messages from the client device 1 to the web server device 3a is via a NAT router 2. The NAT router 2 may be an F5 load balancer. The NAT router here provides two main (conventional) functions. Firstly, it serves to provide workload balancing between the web servers 3a, 3b, 3c, by routing messages to a selected one of the servers. Secondly, it provides for network address translation (NAT) of inbound (from the client device 1 towards the servers 3a, 3b, 3c) and outbound (from the servers 3a, 3b, 3c towards the client device 1) messages. The NAT router 2 provides for an IP address range of 9.20.x.x as seen by the server cluster, with inbound messages having their source address translated to an inside network address within this range. While only a single client device is shown in FIG. 1 in the interests of simplicity, it will be appreciated that there will generally be many client devices requesting services of the server cluster via the router 2.

The NAT router comprises a controller 22 which provides overall control of routing, address translation and error handling, and which appropriately directs messages between the client device 1 and the web servers 3a, 3b, 3c. Network address translation (inbound) is carried out by an address translator 24, which dynamically allocates a new network (IP) address for the client device 1 when a request message is received from the client device 1. In particular, the request message will have a source IP address (outside address) identifying the originating client device 1 to the router 2. However, this outside address is not suitable for use within a server domain defined between the router 2 and the servers 3a, 3b, 3c, hence the requirement for network address translation. Specifically, the router 2 maps the outside address (referred to herein as a first network address) into an inside address suitable for use in the server domain, and which corresponds to the NAT router itself. It also maps the first network address to a second network address corresponding to a target device (server) to which the request message is to be forwarded, thereby implementing routing. A correspondence between the first network address and the second network address is stored in a dynamic NAT table 242 until the server has responded to the request message. Generally, each time a new request message is received from a given client device a new second network address is allocated (and thus potentially a different server), however in some cases (for example if only a short period of time has passed since the previous request message from that client device) the same second network address may be used again if it is already present in the NAT table 242 and is not allocated to a different client device. It will also be understood that the dynamic routing may coincidentally map a particular client device to the same server on multiple occasions. While not directly relevant to understanding the present technique, it will be appreciated that outbound network address translation may be carried out in the same way so that inside addresses used within the server domain to represent the servers 3a, 3b, 3c are translated into outside addresses suitable for use outside of that domain. It will be further appreciated that the client device 1 generally does not need to be able to distinguish between the servers 3a, 3b, 3c—since routing of messages to an appropriate one of these is conducted by the router 2. In other words, the server cluster as a whole (with the router 2 acting as a gateway) can be treated externally as a single IP address.

Upon receipt of a request message from the client device 1, the controller 22 selects which of the web servers 3a, 3b, 3c should service the request (and therefore two which the request message should be forwarded) based on a configuration file 26 and a routing algorithm 28. The routing algorithm 28 may be used to select an appropriate one of the servers 3a, 3b, 3c to service the request in order to balance the workload within the cluster. The IP address of the selected server is used as the second network address.

It can be seen from FIG. 1 that a request message REQ has been transmitted from the client device 1 to the router 2. The controller 22 has selected the web server 3a to service the request (based on the routing algorithm 28 and/or the configuration file 26), translated the first network address into a second network address corresponding to the selected web server 3a, and has forwarded the request as a request message REQ' to the web server 3a at the second network address. If the web server 3a were to be able to service the request, then the request would be serviced, which might for example result in one or more response messages and message content being conveyed (through the router 2) back to the client device 1. However, in the present case the web server 3a is unable to service the request, and therefore an error condition handler 30 running on the web server 3a transmits an error message ERR back to the router 2, and in particular to the controller 22. The error message ERR may contain the second network address (server IP address) and a time stamp of the time of generation of the error message ERR. However, provided that the router 2 is able to determine the origin of the error message ERR, at a minimum it is only necessary for the error message ERR to indicate that an error condition has arisen on a particular server device. The controller 22 is responsive to the error message ERR to look up the second network address of the server in the error message ERR in the dynamic NAT table 242. In this way, the controller 22 can identify the first network address associated with the second network address, which identifies the client device which triggered the error condition. A NAT router only preserves dynamic address mapping information for the time required for the server to handle the request message and provide a response message, and for the router to forward the response message on to the client device. As a result, the error message ERR should be sent to the NAT router prior to a response message being sent from the server to the NAT router, otherwise the dynamic NAT table 242 may no longer hold the information required to identify the originating (client) device.

The identity of the client device can optionally be provided to server device 3a, or an administrator thereof to assist with resolving the error, or for error logging purposes.

The controller 22 may then associate the first network address of the client device 1 with a third, static, network address in a static NAT table 244, the third network address being the IP address of one of the server devices. In this case, subsequent messages from the first network address will always (until the association between the first network address and the third network address is revoked) be forwarded to the server device 3a indicated by the third network address. It will be appreciated that a single table could be used instead of separate tables for the dynamic and static address mappings, with flags or characteristics of the address structure being used to distinguish dynamic and static addresses from each other. As an alternative to using static network addresses, the controller may mark the first network address for pass-through mode, in which the first (outside) network address is retained as a source address when forwarding messages from the client device 1 to the server 3a, rather than carrying out network address translation.

It will be appreciated from the above that when a target server 3a application detects an error as a response to a client request, it sends to the router 2 an event which preferably includes the network address of the server. At any given time, the server is only servicing a request from one client device, and so by identifying the server and checking the NAT table it is possible to identify the client device which made the request which triggered an error condition. The NAT router 2 therefore receives the error event, and looks up the originating IP address, dynamically switching that address into a static mapping or straight pass-through. As a result of this, when the server fires another error event, this time it contains an "outside" (first) IP address in the case of a pass-through, or a static (third) IP address. When the NAT router 2 looks up and discovers that the IP address included in the event is static or outside, it knows that the target server has the means to identify the originating IP (via the look up table 244 if static) and the router 2 also knows that this client device has already generated an earlier error (because the address is not a dynamic NAT address) and if configured to do so, can now block or redirect any further requests from that client until it has been informed that the error has been resolved (by another protocol, or a manual step).

Figure 2:
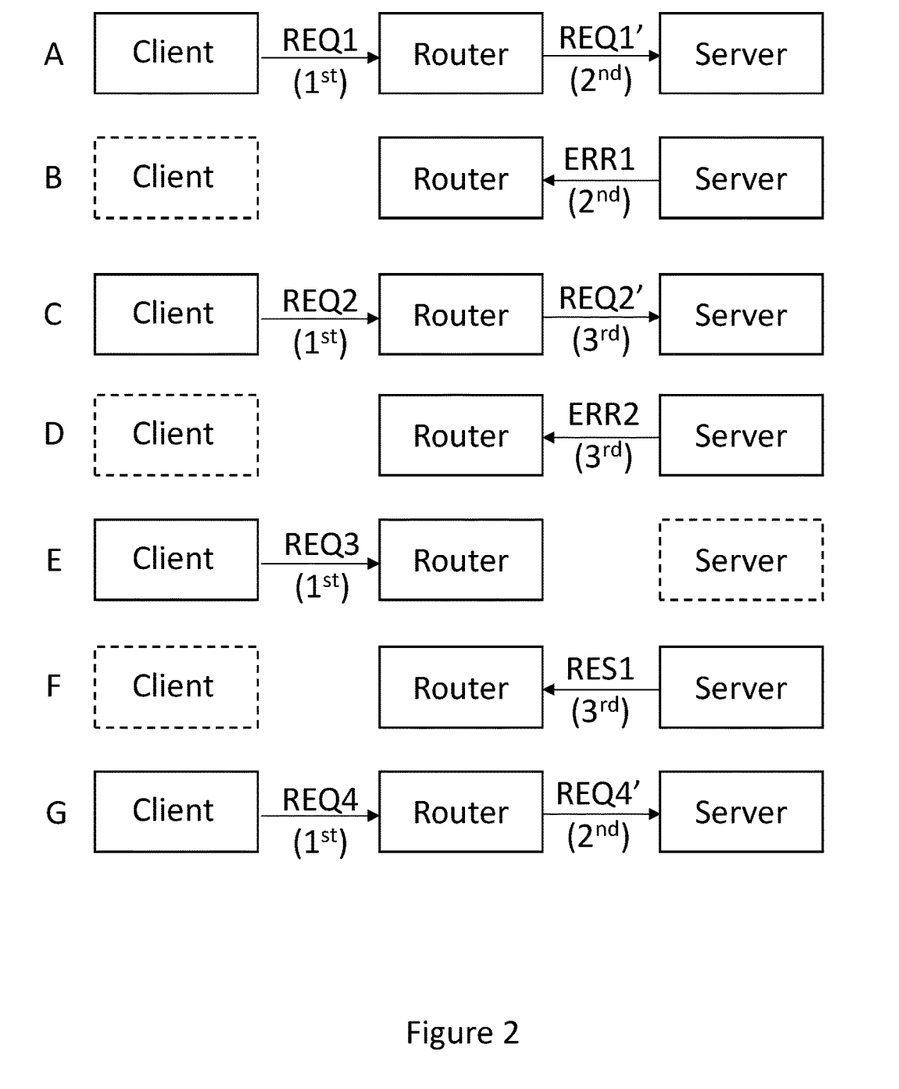
FIG. 2 schematically illustrates a series of message exchanges and router operations for handling error conditions.

Referring to FIG. 2, an ordered sequence of operations A to H at the router 2 is shown. The three network entities shown in the operations are the client device 1, the router 2 and the server 3a. For each operation, an entity shown in dashed lines is not involved in that operation. Operation A is the receipt (from the client device 1) at the router 2 of a first request message REQ1, having a first network address as a source address, the address translation of the first network address into a second network address, which is then used as the destination address for a forwarded version of the first request message REQ1, denoted REQ1', which is transmitted from the router 2 to the server 3a. As mentioned above, an association between the first network address and the translated second network address is stored in the dynamic NAT table 242.

Operation B is the generation of an error message at the server 3a in response to an error condition arising in relation to the request made by the request message REQ1', and the transmission of the error message ERR1 to the router 2, along with the second network address, which identifies to the router 2 the server 3a. The router 2 refers to the address mapping information to identify the first network address of the client device 1 which issued the request message REQ1 which caused the error condition at the server 3a. The first network address may optionally be communicated to the server 3*a* for error logging purposes, or in some cases to aid diagnosis of the error (and resolution of the error if this requires remedial action at the client device 1). The first network address may also optionally be used to address a status update message to the client device 1 to advise it that there is a problem in servicing the request it made. At operation B, the router 2 also updates the address mapping information (which may be implemented as the NAT tables 242, 244 described above) to associate the first network address with either a third, static, network address, or to operate in a pass-through mode in which the first network address is retained and subsequent request messages received from the client device 1 are forwarded to the server 3 using the (outside) first network address as the source address.

Operation C is the receipt (from the client device 1) at the router 2 of a second request message REQ2, having a first network address as a source address, the address translation of the first network address into a third, static, network address (for example using the static NAT table 244), which is then used as the destination address for a forwarded version of the second request message REQ2, denoted REQ2', which is transmitted from the router 2 to the server 3*a*. Operation D is the generation of a further error message ERR2 at the server 3*a* in response to the receipt of a further request from the client device 1 while the previously triggered error condition has not yet been resolved, and the transmission of the error message ERR2 to the router 2, along with the third network address associated with the first request message REQ2'.

In operation D, the router 2 identifies that a second error message has been generated in relation to requests made by a particular client device, based on the fact that static network address translation or a pass-through mode is being used in relation to messages from that client device, that is, the third network address appears in the static NAT table 244. This may be determined by referring to the address mapping information (dynamic NAT table 242 and static NAT table 244). As a result of this determination, the router 2 may configure routing information in the configuration file 26 to cause any further request messages from the client device 1 to be handled differently. The router 2 may also be responsive to this determination to alter the third network address specified in the static NAT table 244 to indicate a different server device. The first network address (obtained from one of the NAT tables 242, 244) may also optionally be used to address a status update message to the client device 1 to advise it that there is or continues to be a problem in servicing the request it made. It will be appreciated that while operations C and D are described with reference to static network address translation, the same principles would apply for the use of pass-through of the first network address.

Operation E is the receipt (from the client device 1) at the router 2 of a third request message REQ3, having a first network address as a source address, and a decision at the router 2 not to forward the third request message REQ3 to the server 3*a*, based on the presence of the first network address in the static NAT table 244, and information in the configuration file 26. The operation E will be conducted each time a further request message is received from the client device until the error condition at the server device 3*a* has been resolved. Operation F is the generation of an error resolution message RES1 at the server device 3*a* and its transmission to the router 2 in association with the third network address (or first network address in the case of pass-through mode). The router 2 is responsive to receipt of the error resolution message RES1 to update the routing table in relation to the first network address/client device 1 to reinstate the original routing scheme (which might be to direct future requests from the client device 1 to the server device 3*a*, or might be to utilise the original workload balancing algorithm). More specifically, the router 2 is responsive to receipt of the error resolution message RES1 to update the address mapping information (for example by deleting the relevant entry in the static NAT table 244) to revert to dynamic network address translation (using the dynamic NAT table 242) for the first network address of the client device 1. In this way, the system state is reset to its condition prior to the error condition having been triggered at the server 3*a*. Operation G is the receipt (from the client device 1) at the router 2 of a fourth request message REQ4, having a first network address as a source address, the address translation of the first network address into a second network address, which is then used as the destination address of a forwarded version of the first request message REQ4, denoted REQ4', which is transmitted from the router 2 to the server 3*a*. An association between the first network address and the translated second network address is stored in the dynamic NAT table 242. In other words, operation G is substantially the same as operation A following the resolution of the error condition at the server 3*a*, and the notification of this resolution to the router 2.

Figure 3:
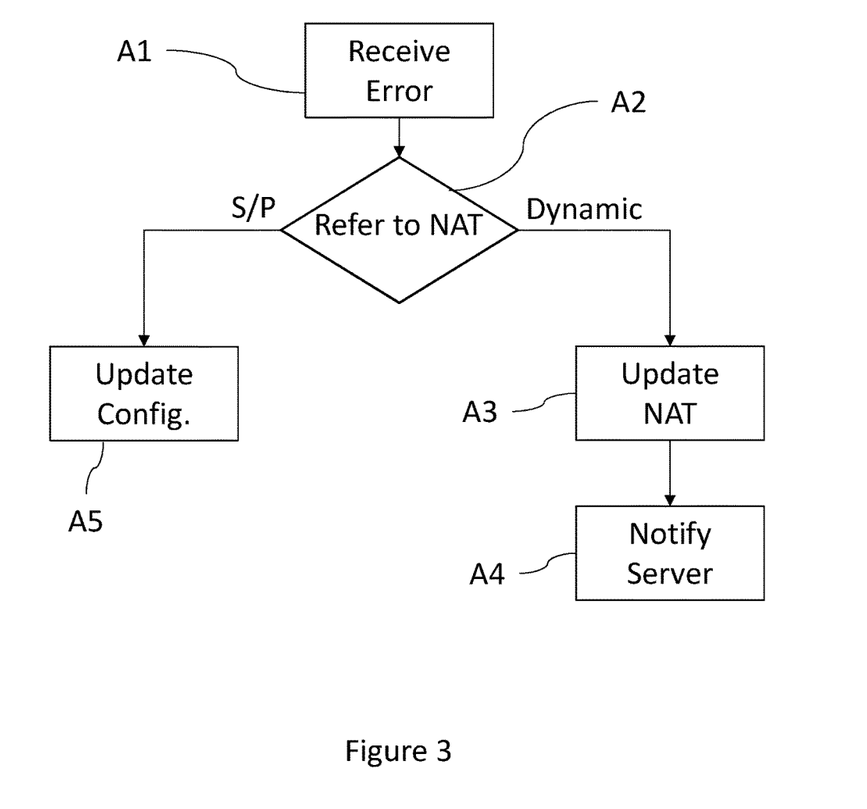
FIG. 3 is a schematic flow diagram of a method of configuring the NAT router in response to an error condition at a server device.

Referring to FIG. 3, an example method of updating address mapping information and routing information at the router 2 in response to an error condition is shown. At a step A1 an error message is received at the router 2 from a server. Network address information identifying the server is extracted from the error message. At a step A2, the NAT tables are consulted to determine whether the extracted network address is a dynamic NAT address (second network address) or a static NAT address (third network address). If it is determined that the extracted network address is a dynamic NAT address, then the router 2 knows that this is the first error message (that is, message ERR1 in FIG. 2) from the server indicating the occurrence of a new error condition. In this case, at a step A3 the NAT tables are updated to switch from the use of a dynamic NAT address to either a static NAT address or a pass-through mode in which the original source (outside) address (first network address) of the client device 1 is used directly as a source address when communicating further request messages to the server. At a step A4 the server is notified of the identity of the originating client device for data logging/resolution purposes. If at the step A2 it is determined that the extracted network address is a static NAT address, or an untranslated pass-through network address, then at a step A5 the configuration file 26 is updated to indicate that subsequent messages from this client device should be inhibited from being forwarded to the server. In other words, the step A5 is carried out where the error message is determined to be message ERR2 in FIG. 2.

Figure 4:
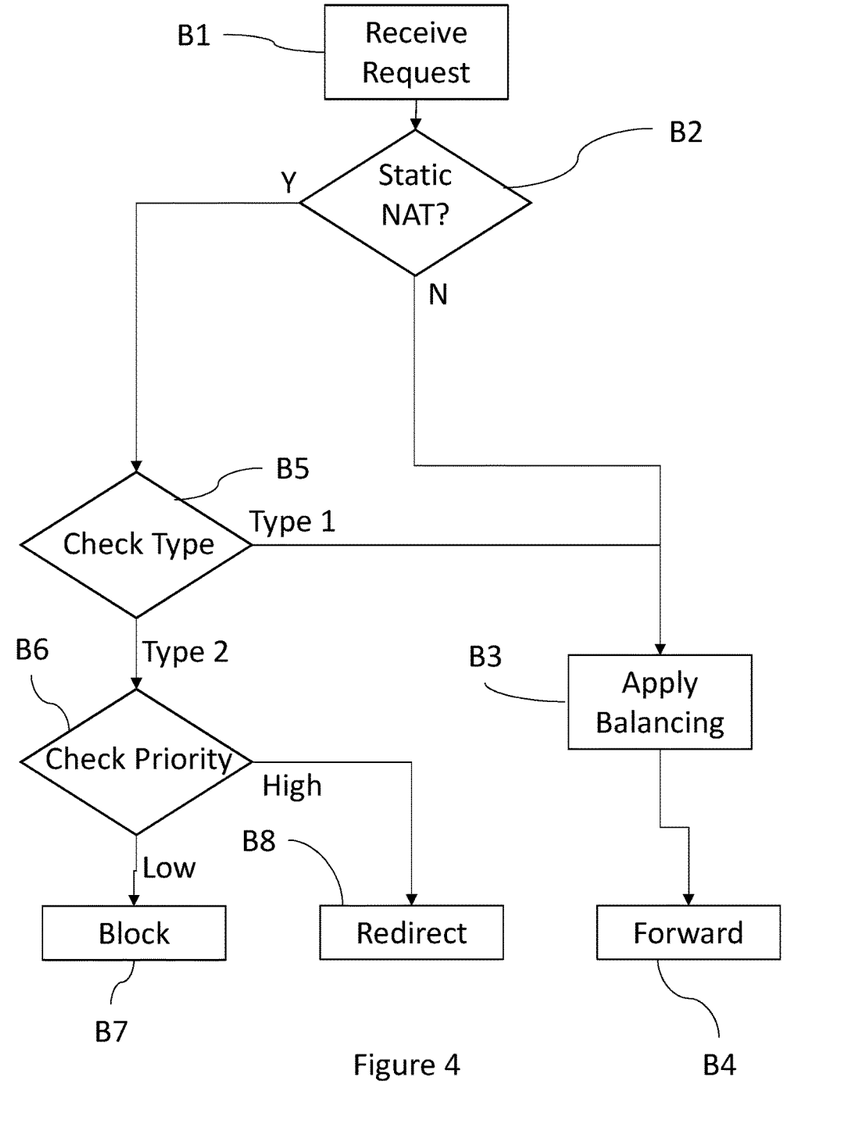
FIG. 4 is a schematic flow diagram of a method of handling request messages received from client devices.

Referring to FIG. 4, an example method of handling routing to a server device is shown. FIG. 4 should be read in association with FIG. 3, which explains how the NAT tables 242, 244 and configuration file 26 are modified in response to error messages from servers. At a step B1, a request message is received at the router 2 from a client device. At a step B2, it is determined whether there is an ongoing error condition in relation to a request previously made by the originator of the request message, by checking the static NAT table 244. If the IP address of the originator of the request message is not listed in the NAT table 244, then an error condition is assumed not to exist. In this case, at a step B3 the balancing algorithm is applied to select a suitable server to service the request, an IP address for the selected server is allocated, and the dynamic NAT table 242 updated to store the mapping between the IP address of the originator device and the IP address of the selected server, and then the request message is forwarded to the selected server using its IP address at a step B4. If however at the step B2 it is determined that the IP address of the originator of the request message is listed in the static NAT table 244, then an error condition is assumed.

If an error condition has been identified at the step B2, then at a step B5 a type of the request message is identified. The type may for example be the type of service being requested (in the context of a web server the type may be accessing a particular type of web page, or downloading a file versus accessing a web page for example). If the request message is of a first type, then it may be determined that it can be serviced normally even though an error condition is ongoing. This may be because the type of the request message, or the type of service being requested, is different from the type of service which triggered the error condition. In the case that the request is determined to be of a first type, the steps B3 and B4 are carried out, as described above. If the request is determined to be of a second type, then the priority of the request message is determined at a step B6. The priority of the request message may be an inherent property of the message (for example based on header fields within the request message), or may be based on an application defined priority for messages from a particular client device, such priority information being received from the server within the error message. For example, an error message may both indicate the presence of an error, and also indicate that the nature of the request should be considered unimportant (for example not time critical). Alternatively, the error message may indicate instead that the nature of the request is important (for example it is time critical). If the priority of the request message is considered to be low, then the request message is simply blocked at the router 2 at a step B7, and goes no further. If however the priority of the request message is considered to be high, then the request message is redirected to another server at a step B8. The server to which the request message is redirected may be chosen from the remaining servers (that is, the servers other than the server at which an error condition is ongoing) based on the routing algorithm described above. Rules for handling request messages following an error condition may be specified in the configuration file. The server originating an error message may instruct the router how further messages should be handled by way of updating the configuration file. The rules contained within the configuration file may include those relating to type and priority.

It will be appreciated that if a client device does not have its request satisfied, it may retransmit a request message. By way of the above technique, while the first and second request messages may reach the server, subsequent messages may be redirected to another server, which is able to service the request, which is preferable (from a client device perspective) to an arrangement in which the request continues to be unsuccessfully serviced by a server which is experiencing an error condition. Further, from the server perspective, a server may issue an error message to the router to reject a request and effectively force the router to use another server instead, reducing the number of non-serviceable request messages received by the server. It will be understood that variations on the above implementation can be provided. For example, the blocking or redirecting of subsequent request messages may be triggered by a first, second, third or later error message by simply tracking at the NAT router the number of error messages received in relation to the same client device or network address (for example in the configuration file 26). In one example, the receipt of one or more error messages at the router in relation to a particular client device may cause the router to add that client device to a block list of client devices in relation to which incoming request messages should be blocked. More generally, the error message effective requires the router 2 to disable dynamic routing for a specific network address—in the above example either by dynamically switching to a static NAT address or to a straight pass-through mode—bypassing the network address translation algorithm altogether. The server 3a may include in an error message an instruction as to whether to redirect to another server or block entirely further request messages. This instruction may be based on the reason that the error condition has arisen.

In one example implementation of a web server, the priority of a request message may relate to whether it is requesting a premium service. If the currently selected server is not capable of providing the premium service then an error message may be transmitted to the router. If none of the servers are capable of providing the premium service, then subsequent request messages may simply be blocked entirely (preferably with the client device being notified accordingly), while if some of the servers in the cluster are capable of providing the premium service then the router 2 will keep selecting servers in accordance with its algorithms until the request is accepted by one of the servers.

In another example implementation, the priority of a request message may relate to whether the requesting client device is local to (either geographically or in network topography terms) the server cluster or distant to the server cluster. A high priority request may be one from a local client device while a low priority request may be one from a distant client device. The location information required for the router to determine this may for example be available in header information within the request message.

In another example, a further level of priority may be a critical request message, which is forwarded to the server having the error condition in spite of the error condition.

Error conditions may be triggered due to a lack of memory or disk space resources at a server. In this case, a request which cannot be serviced due to a lack of disk space or memory at a given server will be rejected with an error message as described above, which will result in the router allocating subsequent requests from that client device to a different server device within the cluster.

While all inbound connections/request messages/client devices could be mapped to unique inside IP addresses on the internal (server/router domain) network, in some cases two or more client devices could be mapped to the same internal IP address, but with different port numbers being used to distinguish between these. In this case, the network addresses referred to above may be taken to include the IP address and port number taken in combination.

It will therefore be appreciated that the above described technique makes it possible for a server (for example an MQ server) in a load balanced environment to be able to determine the original or source IP address of a remote client after the source IP address has been subject to network address translation by a NAT router. This makes it possible for backend administrators of a server cluster to identify a misbehaving client device or application even though the server itself is unable to reverse the network address translation to uniquely identify the client device.

While the example of a multitude of web application servers acting as clients is used above, it will be appreciated that the present technique of routing request messages may be applied to any kind of client application. For example, the server devices may be messaging servers and the request messages may be requests to deliver message information to another device. Generally, the present technique allows an application server to feed back to a NAT router error conditions associated with the application server or a request received at the application server (through the NAT router), permitting subsequent routing to be controlled. It can be viewed that this technique breaks the conventional OSI layer model, by permitting an application layer component (server application) to enlist a transport layer component (routing decisions and address translation at the NAT router) in an error handling routine.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structure in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may computer copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FGPA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture instructing instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality and operation of possible implementations of systems, methods, and computer program products according to various embodiments of the present invention. In this regard, each block in the flowchart of block diagrams may represent a module, segment, or portion of instruction, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of routing messages, comprising:
receiving, at a routing device, a request message from an originating device to be forwarded to one of a plurality of target devices, the request message having a first network address as a source address identifying the originating device;
dynamically mapping the first network address of the request message to a second network address of a selected target device, storing the first and second network addresses in association with each other as address mapping information, and forwarding the request message to the selected target device using the second network address;
receiving from the target device an error message in relation to the request message;
identifying the originating device which originated the request message using the address mapping information and the second network address of the target device which issued the error message;
configuring the routing of a later request message from the identified originating device;
updating the address mapping information to associate the first network address with a third, static, network address of a target device to which subsequent messages from the originating device should be sent, in response to receipt of the error message;
receiving at the routing device a second request message following the request message which triggered the error message from the originating device, and forwarding the second request message to a server at the third network address,
receiving from the selected target device a second error message in relation to the second request message; and
selecting at the routing device a target device to which the request message is to be sent based on a workload balancing algorithm.

2. A method according to claim 1, wherein configuring the routing comprises configuring the routing device to not forward a later message received from the identified originating device to any of the target devices.

3. A method according to claim 1, wherein configuring the routing comprises configuring the routing device to forward a later message received from the identified originating device to one of the plurality of target devices other than the target device from which the error message has been received.

4. A method according to claim 1, wherein configuring the routing comprises identifying a priority or type of a subsequent message received from the identified originating device, and determining whether or not to forward that message to the target device from which the error message has been received in dependence on the priority or type of the subsequent message.

5. A method according to claim 1, wherein configuring the routing comprises identifying a priority or type of a subsequent message received from the identified originating device, and either blocking the subsequent message entirely or redirecting it to a different one of the target devices in dependence on the identified priority or type of the subsequent message.

6. A method according to claim 1, comprising updating the address mapping information to indicate that the first network address should be used when transmitting to a selected target device subsequent messages received from the originating device.

7. A method according to claim 6, comprising:
receiving at the routing device a second request message following the request message which triggered the error message from the originating device, and forwarding the second request message to a server using the first network address,
receiving from the selected target device a second error message in relation to the second request message; and
updating routing information at the routing device to configure the routing device to inhibit routing of later request messages from the identified originating device to the target device.

8. A method according to claim 1, wherein the target device generates the error message in response to detection of an error condition.

9. A method according to claim 1, wherein the error message indicates that the target device cannot service the request made by the request message.

10. A method according to claim 1, wherein the target device is responsive to a lack of available memory at the target device to issue the error message.

11. A method according to claim 1, comprising receiving an error resolution message from the target device from which the error message was received, and in response to the error resolution message reconfiguring the routing device to dynamically map request messages from the identified originating device.

12. A method according to claim 1, wherein the target devices are web servers and the request message is an http request message.

13. A method according to claim 1, wherein the target devices are messaging servers and the request message is a request to deliver message information to another device.

14. A system for routing messages, comprising:
an originating device;
a plurality of target devices; and
a routing device having a processor in communication with a memory, the processor operable:
to receive a request message from the originating device to be forwarded to one of the target devices, the request message having a first network address as a source address identifying the originating device;
to dynamically map the first network address of the request message to a second network address of a selected target device;
to store the first and second network addresses in association with each other as address mapping information;
to forward the request message to the selected target device using the second network address;
to receive from the selected target device an error message in relation to the request message;
to identify the originating device which originating the request message using the address mapping information;
to configure the routing of a later request message from the identified originating device;

to update the address mapping information to associate the first network address with a third, static, network address of a target device to which subsequent messages from the originating device should be sent, in response to receipt of the error message;

to receive at the routing device a second request message following the request message which triggered the error message from the originating device, and forwarding the second request message to a server at the third network address, to receive from the selected target device a second error message in relation to the second request message; and to select at the routing device a target device to which the request message is to be sent based on a workload balancing algorithm.

15. A computer program product for routing messages, the computer program product comprising a non-transitory computer readable storage medium having program instructions embodied therewith, the program instructions executable by a data processing apparatus to cause the data processing apparatus to perform a method comprising:

receiving, at a routing device, a request message from an originating device to be forwarded to one of a plurality of target devices, the request message having a first network address as a source address identifying the originating device;

dynamically mapping the first network address of the request message to a second network address of a selected target device, storing the first and second network addresses in association with each other as address mapping information, and forwarding the request message to the selected target device using the second network address;

receiving from the target device an error message in relation to the request message;

identifying the originating device which originated the request message using the address mapping information and the second network address of the target device which issued the error message;

configuring the routing of a later request message from the identified originating device;

updating the address mapping information to associate the first network address with a third, static, network address of a target device to which subsequent messages from the originating device should be sent, in response to receipt of the error message;

receiving at the routing device a second request message following the request message which triggered the error message from the originating device, and forwarding the second request message to a server at the third network address, receiving from the selected target device a second error message in relation to the second request message; and selecting at the routing device a target device to which the request message is to be sent based on a workload balancing algorithm.

* * * * *